(12) United States Patent
Wakabayashi

(10) Patent No.: US 8,632,191 B2
(45) Date of Patent: Jan. 21, 2014

(54) PROJECTOR

(75) Inventor: Shinichi Wakabayashi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 229 days.

(21) Appl. No.: 13/160,006

(22) Filed: Jun. 14, 2011

(65) Prior Publication Data

US 2011/0310364 A1 Dec. 22, 2011

(30) Foreign Application Priority Data

Jun. 22, 2010 (JP) ................................. 2010-141396

(51) Int. Cl.
| | |
|---|---|
| *G03B 21/14* | (2006.01) |
| *G03B 21/22* | (2006.01) |
| *G03B 3/00* | (2006.01) |
| *G02B 7/02* | (2006.01) |
| *G02B 15/14* | (2006.01) |

(52) U.S. Cl.
USPC ........... 353/101; 353/100; 353/119; 359/694; 359/696; 359/813; 359/822

(58) Field of Classification Search
USPC .................. 353/100–101, 119, 122; 359/649, 359/694–698, 811, 813–814, 819, 822; 396/75, 133, 343; 476/27, 34; 74/10.8, 74/347, 385, 417, 423
See application file for complete search history.

(56) References Cited

U.S. PATENT DOCUMENTS

| | | | | |
|---|---|---|---|---|
| 2,772,600 A | * | 12/1956 | Walker | 353/37 |
| 3,158,076 A | * | 11/1964 | Back et al. | 359/694 |
| 3,891,314 A | * | 6/1975 | Lakin et al. | 353/101 |
| 3,997,245 A | * | 12/1976 | Uesugi | 359/705 |
| 5,717,529 A | * | 2/1998 | Scharf | 359/739 |
| 6,185,375 B1 | * | 2/2001 | Mikami | 396/84 |
| 6,416,184 B1 | * | 7/2002 | Arai et al. | 353/52 |
| 6,755,540 B1 | * | 6/2004 | Runco | 353/101 |
| 7,090,360 B2 | * | 8/2006 | Kuroda et al. | 353/119 |
| 7,192,162 B2 | * | 3/2007 | Tanaka et al. | 362/268 |
| 7,204,598 B2 | * | 4/2007 | Kuroda et al. | 353/101 |
| 7,486,453 B2 | * | 2/2009 | Shimizu | 359/819 |
| 7,714,259 B2 | * | 5/2010 | Oda | 250/201.2 |
| 7,817,353 B2 | * | 10/2010 | Oh et al. | 359/695 |

(Continued)

FOREIGN PATENT DOCUMENTS

| | | |
|---|---|---|
| CN | 1577056 A | 2/2005 |
| CN | 1580938 A | 2/2005 |

(Continued)

*Primary Examiner* — Tony Ko
*Assistant Examiner* — Jori S Reilly-Diakun
(74) *Attorney, Agent, or Firm* — Oliff & Berridge, PLC

(57) ABSTRACT

A projector includes: an electro-optic device which modulates light emitted from a light source; a projection lens which projects the light modulated by the electro-optic device; and a lens shift mechanism which shifts the projection lens in a direction perpendicular to the optical axis of the projection lens, wherein the lens shift mechanism includes a shift unit which supports the projection lens and shifts the projection lens in the direction perpendicular to the optical axis, a guide unit which guides the shift of the shift unit, and a drive unit which moves the shift unit, and the drive unit includes a rotation section as a rotated part which has a first bevel gear rotating around a center axis extending in the same direction as that of the optical axis, and a transmission section which has a second bevel gear engaging with the first bevel gear and transmits the rotation of the rotation section to the shift unit.

12 Claims, 7 Drawing Sheets

(56) References Cited

U.S. PATENT DOCUMENTS

| | | |
|---|---|---|
| 8,111,469 B2 * | 2/2012 | Takamatsu ................... 359/696 |
| 8,189,279 B2 * | 5/2012 | Chen ............................ 359/822 |
| 2005/0024596 A1 | 2/2005 | Kuroda et al. |
| 2005/0030492 A1 | 2/2005 | Gishi |
| 2006/0244933 A1 | 11/2006 | Kuroda et al. |
| 2010/0202067 A1 * | 8/2010 | Chen ............................ 359/822 |
| 2011/0090578 A1 * | 4/2011 | Yoshimura ................... 359/811 |
| 2012/0075731 A1 * | 3/2012 | Iikawa et al. ................ 359/824 |
| 2012/0285280 A1 * | 11/2012 | Chang ............................ 74/411 |

FOREIGN PATENT DOCUMENTS

| | | | |
|---|---|---|---|
| JP | 09244123 A | * | 9/1997 |
| JP | A-2007-33591 | | 2/2007 |
| JP | B2-132-3913685 | | 2/2007 |
| JP | B2-4278422 | | 3/2009 |

* cited by examiner

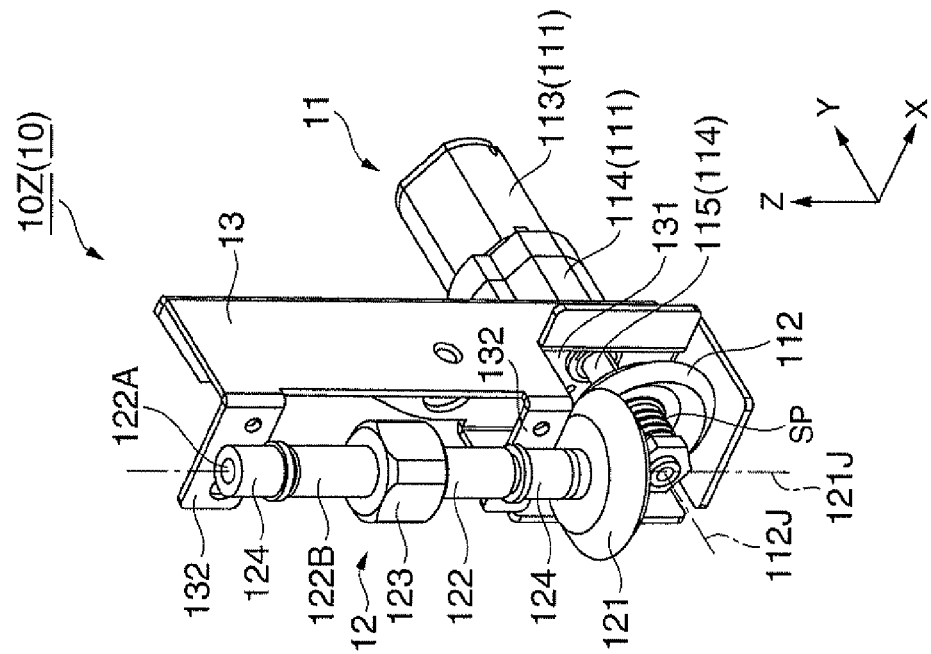
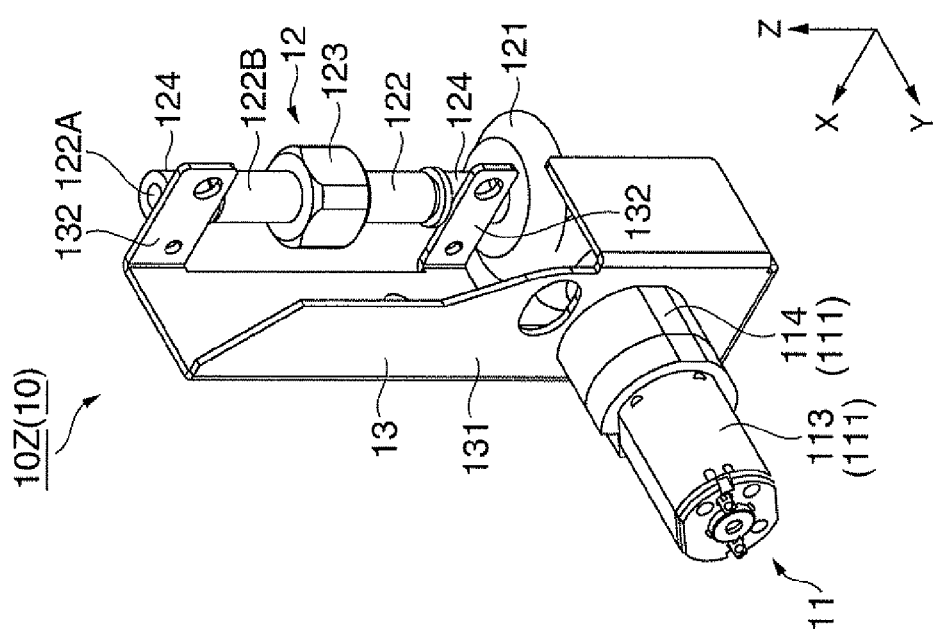
FIG. 7B
FIG. 7A

PROJECTOR

This application claims priority to Japanese Application JP 2010-141396 filed in Japan on Jun. 22, 2010, the entire disclosure of which is hereby incorporated in its entirety.

BACKGROUND

1. Technical Field

The present invention relates to a projector.

2. Related Art

A projector which includes an electro-optic device for modulating light emitted from a light source, and a projection lens for projecting the modulated light is known. In the field of this projector, such a type which has a lens shift mechanism capable of shifting a projected image without change of the posture of the projector by a user has been proposed (for example, see JP-A-2007-33591).

The lens shift mechanism disclosed in JP-A-2007-33591 includes a frame member for supporting the projection lens, a pair of guide shafts disposed on both sides of the projection lens, a base frame fixed to the inside of the projector, and a shift mechanism unit.

The frame member has sliders into which the pair of the guide shafts are inserted, and a connection frame provided between one of the sliders and the projection lens. The connection frame has a nut. The shift mechanism unit has a function of shifting the frame member, and includes a screw engaging with the nut, a rotation transmission gear mechanism, and a driving motor. The rotation transmission gear mechanism has a worm gear, a spur gear or the like, and is disposed on the base frame. According to this structure, the screw rotates in accordance with the drive of the motor transmitted via the rotation transmission gear mechanism, whereupon the frame member engaging with the screw rises or descends along the guide shafts. As a result, the projection lens supported by the frame member shifts with the frame member.

According to the projector disclosed in JP-A-2007-33591, the sliders and the connection frame are disposed on an area in the vicinity of the side of the projection lens. In addition, as shown in the figure, the components such as the motor are disposed in such positions as to project from the base frame. In this case, the size of the lens shift mechanism increases. Moreover, while JP-A-2007-33591 shows an embodiment in which the projection lens is shifted in the vertical direction by using the lens shift mechanism, the size of the projector further increases in such a case where the projection lens is shifted in the horizontal direction as well as in the vertical direction.

SUMMARY

An advantage of some aspects of the invention is to provide a technology capable of solving at least a part of the aforementioned problems, and the invention can be implemented as the following forms or application examples.

APPLICATION EXAMPLE 1

This application example of the invention is directed to a projector which includes: an electro-optic device which modulates light emitted from a light source; a projection lens which projects the light modulated by the electro-optic device; and a lens shift mechanism which shifts the projection lens in a direction perpendicular to the optical axis of the projection lens. The lens shift mechanism includes: a shift unit which supports the projection lens and shifts the projection lens in the direction perpendicular to the optical axis; a guide unit which guides the shift of the shift unit; and a drive unit which moves the shift unit. The drive unit includes: a rotation section as a rotated part which has a first bevel gear rotating around a center axis extending in the same direction as that of the optical axis; and a transmission section which has a second bevel gear engaging with the first bevel gear and transmits the rotation of the rotation section to the shift unit.

According to this configuration, the projection lens supported by the shift unit shifts in the direction perpendicular to the optical axis by the rotation of the rotation section transmitted by the transmission section while guided by the guide unit. The first bevel gear of the rotation section engages with the second bevel gear of the transmission section. The first bevel gear is provided in such a condition as to rotate around the center axis extending in the same direction as that of the optical axis. Since the engagement between the bevel gears is provided such that the respective center axes cross each other and are positioned on the same plane, such an arrangement that the rotation section extends in the direction of the optical axis and that the transmission section extends in a direction crossing the optical axis can be made.

That is, the rotation section can be disposed in the vicinity of the projection lens in such a position as to extend in the same direction as the extending direction of the projection lens, and the transmission section can be disposed in such a position as to extend in the same direction as the shift direction of the projection lens. In this case, the components of the lens shift mechanism can be positioned with high efficiency in the space around the projection lens which often becomes a dead space. Thus, the size of the lens shift mechanism, and thus the size of the entire projector can be reduced.

APPLICATION EXAMPLE 2

In the projector of the above application example, it is preferable that the guide unit of the projector of the above aspect has a holding section which holds the end of the shift unit in such a manner that the shift unit can slide. In this case, an inclined surface inclined to a plane parallel with the shift direction of the shift unit and the optical axis is provided at least either at the end of the shift unit or on the holding section of the guide unit.

According to this configuration, the end of the shift unit shifts while sliding on the holding section of the guide unit. In this case, the shift unit is not required to have a space where a shaft is provided or a shape through which the shaft is inserted unlike a structure where the shift unit shifts along the shaft. Accordingly, the size of the lens shift mechanism, and thus the size of the entire projector can be reduced. Moreover, the inclined surface inclined to the plane parallel with the shift direction of the shift unit and the optical axis is provided at least either at the end of the shift unit or on the holding section of the guide unit. In this case, the shift unit is prevented from moving in two directions perpendicular to the shift direction of the shift unit by the guide unit. Thus, the shift unit can shift with reduced looseness during movement, allowing the projection lens to smoothly shift. Accordingly, the projector can shift a projected image with fine control.

APPLICATION EXAMPLE 3

In the projector of the above application example, it is preferable that the guide unit of the projector of the above aspects has a reference side guide section and an adjustment side guide section whose position with respect to the reference side guide section can be controlled. In this case, the adjustment side guide section has a part of the holding section corresponding to the inclined surface, and the reference side guide section has the other part of the holding section.

According to this configuration, the holding section is separated into a part included in the reference side guide section and a part included in the adjustment side guide section. In this case, the adjustment side guide section has the part of the holding section corresponding to the inclined surface, and is located at an adjustable position with respect to the reference side guide section. Thus, the position of the adjustment side guide section can be controlled in accordance with dimensional variations of the components such as the shift unit such that the contact condition between the shift unit and the holding section can be further appropriately controlled. Accordingly, the shift unit can smoothly shift with higher accuracy.

APPLICATION EXAMPLE 4

In the projector of the above application example, it is preferable that the inclined surface of the projector of the above aspects is provided on each of the forward end and the backward end of the shift unit in the shift direction. In this case, the transmission section is disposed between the forward end side inclined surface and the backward end side inclined surface.

According to this configuration, the inclined surface is provided on four corners of the shift unit or portions of the guide unit corresponding to the four corners of the shift unit. The transmission section is disposed between the forward end side inclined surface and the backward end side inclined surface. In this case, the shift unit shifts with the forward and backward sides thereof in the shift direction supported by the guide unit with a good balance. In addition, the transmission section can be efficiently arranged. Accordingly, smooth shift of the shift unit with higher accuracy can be achieved without increasing the size of the lens shift mechanism.

APPLICATION EXAMPLE 5

In the projector of the above application example, it is preferable that the transmission section of the projector of the above aspects has a transmission main body which shifts in accordance with the rotation of the rotation section. In this case, the shift unit has an engagement member which engages with the transmission main body, and the engagement member is disposed at a position which passes through a plane crossing the shift direction of the shift unit at right angles and containing the optical axis.

According to this configuration, the engagement member of the shift unit engages with the transmission main body, and shifts with the transmission main body in accordance with the rotation of the rotation section. Moreover, the engagement member is disposed at the position which passes through the plane perpendicular to the shift direction and containing the optical axis. That is, the engagement member is positioned substantially at the center of the projection lens in the shift direction. In this case, the projection lens supported by the shift unit can move with the transmission main body with reduced moments produced during movement. Accordingly, power saving achieved by reduction of the power of the rotation section and size reduction of the drive unit, and also smooth shift of the projection lens with higher accuracy can be realized.

APPLICATION EXAMPLE 6

In the projector of the above application example, it is preferable that the gear ratio of the first bevel gear and the second bevel gear is set at 1:1 in the projector of the above aspects.

According to this configuration, the gear ratio of the first bevel gear and the second bevel gear is set at 1:1. In this case, both the bevel gears can be identically shaped, and thus common components can be used to manufacture the first and second bevel gears. Moreover, both the bevel gears can be disposed with higher efficiency than first and second bevel gears having different sizes. Accordingly, cost reduction and further size reduction of the lens shift mechanism can be achieved.

BRIEF DESCRIPTION OF THE DRAWINGS

The invention will be described with reference to the accompanying drawings, wherein like numbers reference like elements.

FIGS. 7A and 7B are perspective views of a drive unit according to the embodiment.

DETAILED DESCRIPTION OF EMBODIMENTS

A projector according to an embodiment of the invention is hereinafter described with reference to the drawings.

The projector in this embodiment modulates light emitted from a light source according to image information and projects the modulated light onto a screen or the like.
General Structure of Projector FIG. 1 schematically illustrates the general structure of a projector 1 according to this embodiment.

Figure 1:
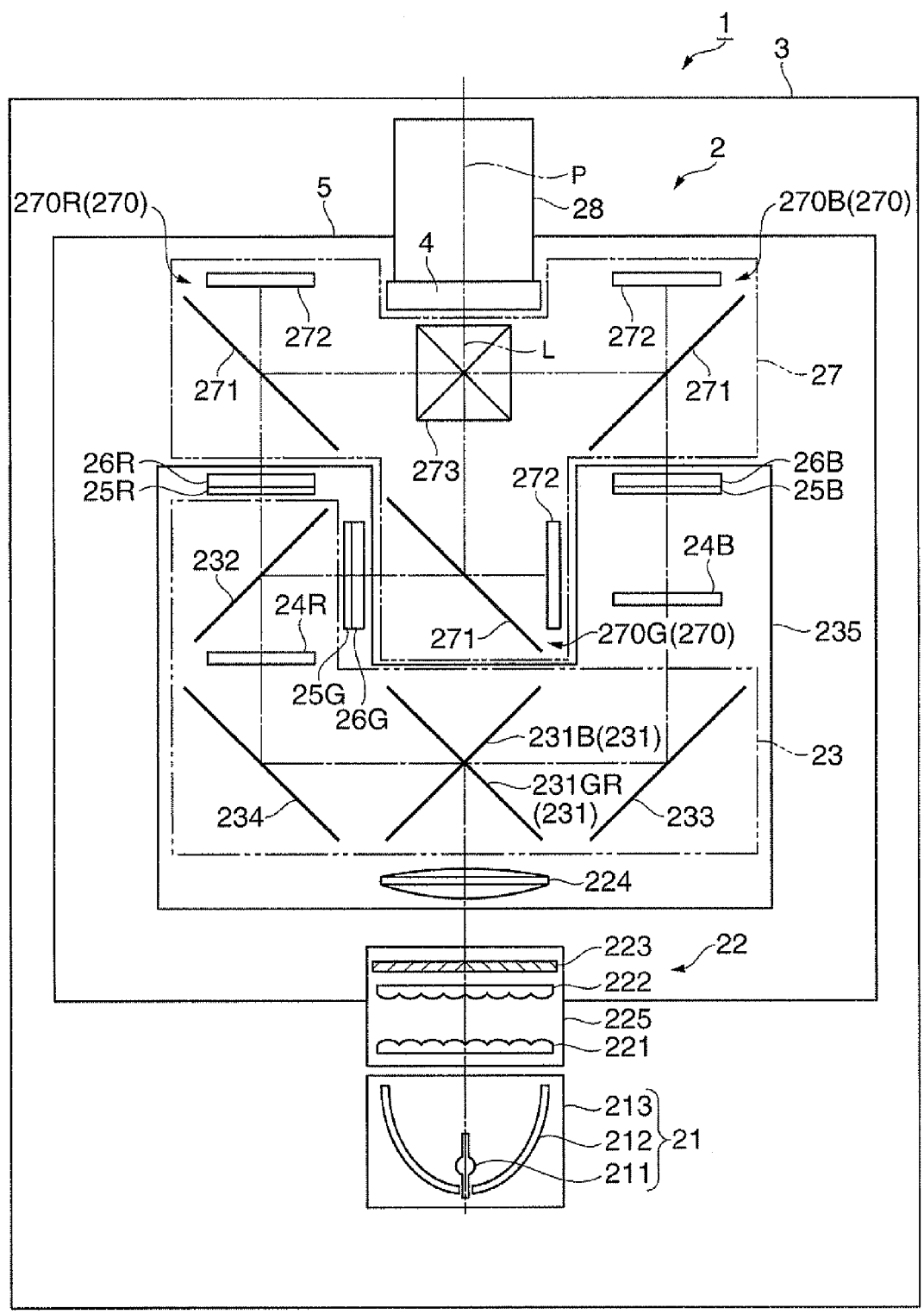
FIG. 1 schematically illustrates the general structure of a projector according to an embodiment.

As illustrated in FIG. 1, the projector 1 includes an optical unit 2 which has a light source device 21, a controller, a power source device (not shown) which supplies power to the light source device 21 and the controller, a cooling fan (not shown) which cools the interior of the projector 1, and an external housing 3 which accommodates these units.

The controller contains a CPU (central processing unit), a ROM (read only memory), a RAM (random access memory) and others to function as a computer. The controller controls the operation of the projector 1 such as control associated with projection of images and control over a lens shift mechanism 4 described later.

The optical unit 2 performs optical processing for light emitted from the light source device 21 under the control of the controller, and projects images after the processing.

Figure 2:
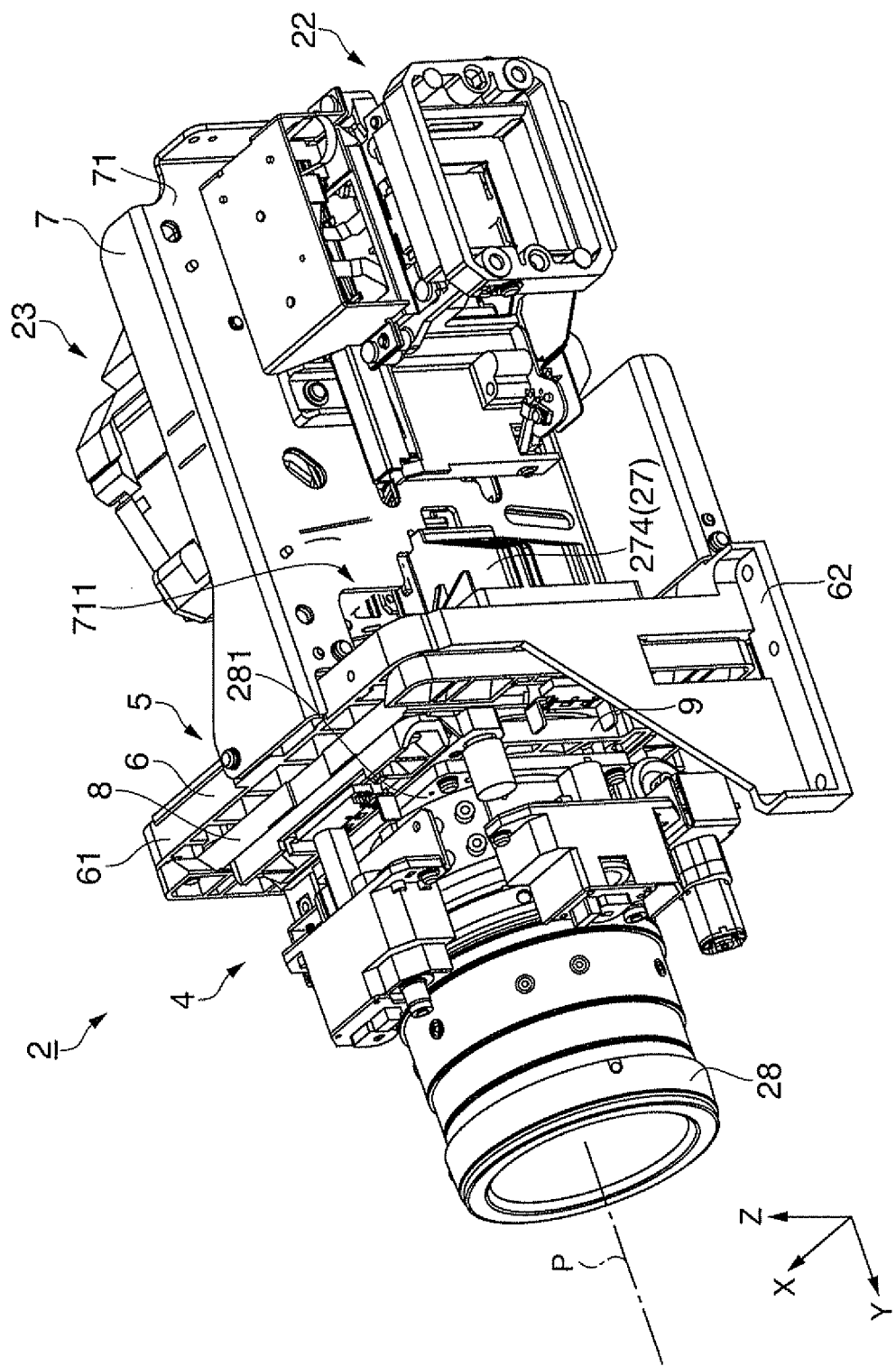
FIG. 2 is a perspective view of an optical unit according to the embodiment.

FIG. 2 is a perspective view illustrating the optical unit 2, and not showing the light source device 21.

As illustrated in FIGS. 1 and 2, the optical unit 2 includes an integrator illumination system 22, a color separation device 23, relay lenses 24R and 24B, polarization plates 25R, 25G, and 25B, collimating lenses 26R, 26G, and 26B, an electro-optic device 27, a projection lens 28, the lens shift mechanism 4, and a holding unit 5 for holding these optical components, as well as the light source device 21.

In the following description, the direction where light is emitted from the light source device 21 corresponds to a +X direction, the direction where light is released from the projection lens 28 corresponds to a +Y direction (front direction), and the direction crossing the X direction and the Y direction at right angles and extending upward as viewed in FIG. 2 corresponds to a +Z direction (upward direction) for convenience of explanation. The respective components shown in FIG. 1 are not illustrated in correspondence with the X, Y and Z directions for easy understanding of the components in the figure.

The light source device 21 includes a discharge-type light source 211 constituted by an extra-high pressure mercury lamp or a metal halide lamp, for example, a reflector 212, and a light source housing 213 which accommodates the light source 211 and the reflector 212. The light source device 21 equalizes the emission direction of the light emitted from the light source 211 by using the reflector 212, and supplies the equalized light toward the integrator illumination system 22.

The integrator illumination system 22 includes a first lens array 221, a second lens array 222, a polarization converting element 223, a stacking lens 224, and an illumination housing 225 which accommodates the first lens array 221, the second lens array 222, and the polarization converting element 223. The stacking lens 224 is contained in a color separation housing 235 described later.

The first lens array 221 has a plurality of small lenses arranged in matrix to divide the light emitted from the light source device 21 into a plurality of partial lights. The second lens array 222 has a structure substantially similar to that of the first lens array 221 to stack the partial lights on the surfaces of light modulation devices 270 described later in cooperation with the stacking lens 224.

The polarization converting element 223 equalizes randomly polarized lights received from the second lens array 222 into first linearly polarized lights to be processed by the light modulation devices 270.

The color separation device 23 includes a cross dichroic mirror 231, a G light reflection dichroic mirror 232, reflection mirrors 233 and 234, and the color separation housing 235 which accommodates these optical components to separate the lights received from the integrator illumination system 22 into three color lights of red light (hereinafter referred to as "R light"), green light (hereinafter referred to as "G light"), and blue light (hereinafter referred to as "B light").

The cross dichroic mirror 231 has a B light reflection dichroic mirror 231 B and a GR lights reflection dichroic mirror 231 GR as two optical components disposed in an X shape. The cross dichroic mirror 231 reflects the B light contained in the lights received from the integrator illumination system 22 by using the B light reflection dichroic mirror 231B, and reflects the G light and the R light by using the GR lights reflection dichroic mirror 231 GR to separate the received lights.

The B light reflected by the B light reflection dichroic mirror 231B and again reflected by the reflection mirror 233 passes through the relay lens 24B, and travels toward the polarization plate 25B. On the other hand, the G light and R light reflected by the GR lights reflection dichroic mirror 231 OR and again reflected by the reflection mirror 234 passes through the relay lens 24R, and travels toward the G light reflection dichroic mirror 232.

The G light reflection dichroic mirror 232 reflects the G light contained in the received G and R lights and transmits the R light as the other light to separate the received lights.

The G light reflected by the G light reflection dichroic mirror 232 is supplied to the polarization plate 25G. The R light transmitted by the G light reflection dichroic mirror 232 is supplied to the polarization plate 25R.

The relay lens 24B has a function of efficiently guiding the B light reflected by the reflection mirror 233 toward the light modulation device 270B described later. Similarly, the relay lens 24R has a function of efficiently guiding the R light reflected by the reflection mirror 234 toward the light modulation device 270R described later. The relay lenses 24B and 24R are accommodated in the color separation housing 235.

The polarization plates 25R, 25G, and 25B are affixed to the collimating lenses 26R, 26G, and 26B, respectively, to increase the contrast of an image to be projected. The polarization plates 25R, 25G, and 25B transmit the first linearly polarized lights in the respective colors received from the color separation device 23, and absorb second linearly polarized lights crossing the first linearly polarized lights substantially at right angles and released as lights whose polarization direction has not been equalized by the polarization converting element 223.

The collimating lenses 26R, 26G, and 26B are so designed as to convert the respective color lights separated by the color separation device 23 into substantially collimated lights for illuminating the light modulation devices 270. The collimating lenses 26R, 26G, and 26B are accommodated in the color separation housing 235 where the polarization plates 25R, 25G, and 25B are also contained.

The electro-optic device 27 includes the light modulation devices 270 provided for each of the three color lights (light modulation device 270R for R light, light modulation device 270G for G light, and light modulation device 270B for B light), a cross dichroic prism 273 as a color combining device, and a holder 274 (see FIG. 2). The electro-optic device 27 modulates the respective color lights separated by the color separation device 23 according to image information, and combines the modulated color lights.

Each of the light modulation devices 270R, 270G, and 270B has a reflection type polarization plate 271, a reflection type liquid crystal panel 272, and a frame.

The reflection type polarization plate 271 has a wire grid type structure which has a number of small linear ribs made of aluminum or the like and arranged in parallel with each other on a glass substrate. The reflection type polarization plate 271 transmits polarized light having the polarization direction perpendicular to the extending direction of the linear ribs, and reflects polarized light having the polarization direction parallel with the extending direction of the linear ribs.

The reflection type polarization plate 271 in this embodiment transmits the first linearly polarized light equalized by the polarization converting element 223, and reflects the second linearly polarized light. A retardation plate may be provided on the upstream side of the reflection type polarization plate 271 along the optical path such that the reflection type polarization plate 271 can transmit the second linearly polarized light and reflect the first linearly polarized light.

The reflection type liquid crystal panel 272 has a so-called LCOS crystal on silicon) structure which contains a liquid crystal layer sandwiched between opposed substrates. This structure includes reflection pixel electrodes provided in matrix on the silicon substrate as one of the substrates, to which electrodes switching elements are connected, and opposed electrodes provided on the other substrate (transparent substrate).

Voltage is applied between the reflection pixel electrodes and the opposed electrodes in response to a drive signal sent from the controller to control the orientation conditions of the liquid crystals of the reflection type liquid crystal panel 272. Then, the first linearly polarized light having passed through the reflection type polarization plate 271 and reached the reflection type liquid crystal panel 272 is modulated thereat and reflected thereby toward the reflection type polarization plate 271. The color lights modulated by the respective reflection type liquid crystal panels 272 and reflected by the respective reflection type polarization plates 271 are supplied to the cross dichroic prism 273.

The frame is provided for each color light to hold the reflection type polarization plate 271 and the reflection type liquid crystal panel 272, and is attached to the cross dichroic prism 273 via a not-shown component.

The cross dichroic prism 273 has a substantially square shape in the plan view produced by affixing four rectangular prisms, and has dielectric multilayer films on the interfaces of the affixed rectangular prisms. The cross dichroic prism 273 transmits the G light received from the light modulation device 270G and reflects the B light and the R light received from the light modulation devices 270B and 270R by using the dielectric multilayer films to combine the respective color lights. The combined light produced by the cross dichroic prism 273 is released toward the projection lens 28 as light having an optical axis L.

The holder 274 as a component for supporting the cross dichroic prism 273 is disposed on the −X side of the cross dichroic prism 273 and fixed to the holding unit 5.

The projection lens 28 constituted by a combination of plural lenses enlarges the combined light produced by the electro-optic device 27, and projects the enlarged light onto a screen or the like. As illustrated in FIG. 2, the projection lens 28 has an optical axis P extending in the ±Y direction, and has a rectangular flange 281 in the plan view disposed on the side of the projection lens 28 to which the combined light is supplied. The flange 281 has insertion holes through which screws are inserted, and positioning holes.

The lens shift mechanism 4 is so designed as to shift the projection lens 28 in two directions perpendicular to the optical axis P (±X direction and ±Z direction) with respect to a reference condition in which the optical axis P and the optical axis L almost agree with each other. The details of the lens shift mechanism 4 will be described later.

The holding unit 5 holds the integrator illumination system 22, the color separation device 23, the electro-optic device 27, and the lens shift mechanism 4. The holding unit 5 is fixed to the external housing 3 while holding these components.

The external housing 3, the details of which are not discussed herein, has an upper case constituting its upper part, and a lower case constituting its lower part. These cases are fixed to each other by screws or the like. The holding unit 5 is supported by the lower case.

The external housing 3 has an operation panel and a remote controller light receiving section (none of them shown) such that various settings and operations can be provided and performed for the projector 1 by operation of the operation panel or of a remote controller.

Structure of Holding Unit

The details of the holding unit 5 are now described.

As illustrated in FIG. 2, the holding unit 5 has a lens holder 6 which holds the electro-optic device 27 and the lens shift mechanism 4, and the optical device holder 7 which holds the integrator illumination system 22 and the color separation device 23. The lens holder 6 also functions as a guide unit for guiding a first shift unit 8 (described later, see FIG. 2) of the lens shift mechanism 4.

The lens holder 6 is initially explained in detail.

Figure 3:
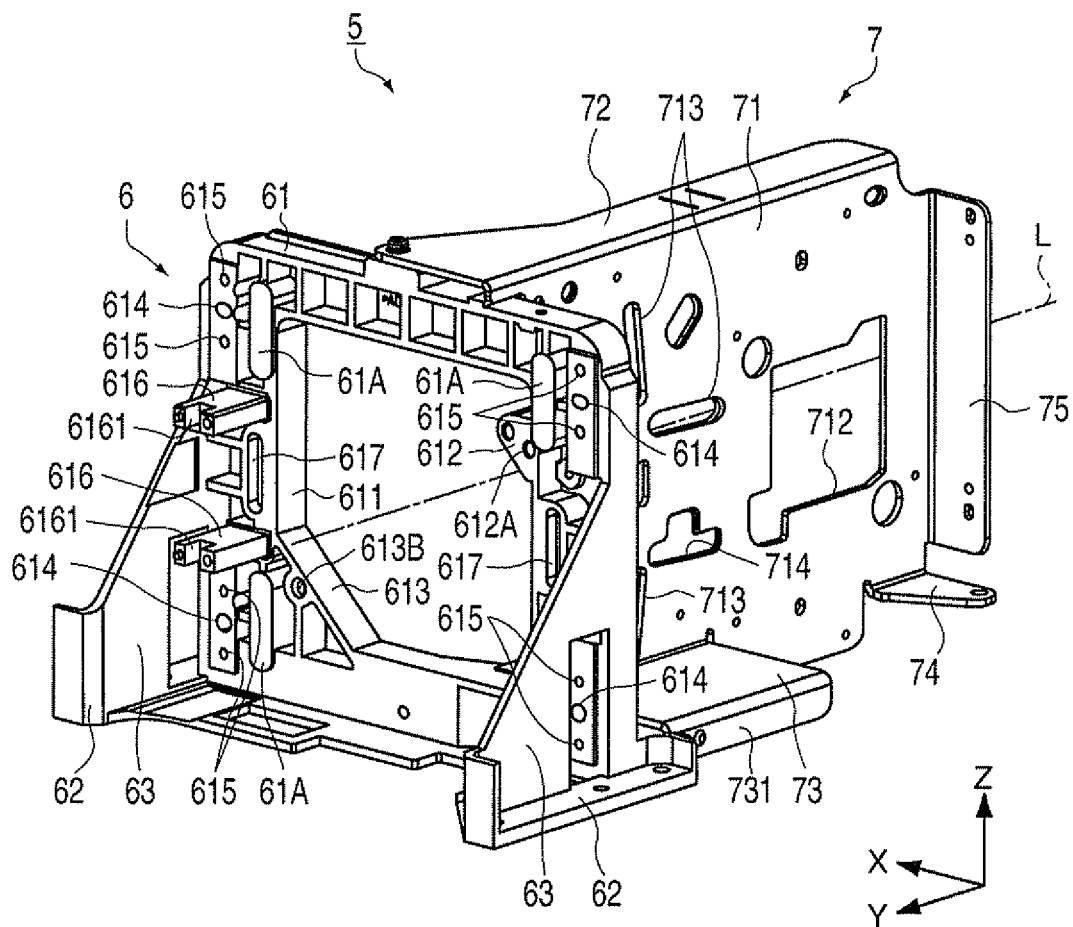
FIG. 3 is a perspective view of a holding unit according to the embodiment.

FIG. 3 is a perspective view illustrating the holding unit 5.

The lens holder 6 is formed from aluminum die casting or the like, and has a base 61 extending along the X-Z plane, and two supports 62 disposed at both ends of the base 61 in the ±X direction and at the lowest positions thereof and extending in the +Y direction as illustrated in FIG. 3. A triangular wall 63 in the plan view is equipped between the base 61 and each of the supports 62 to provide reinforcement therebetween.

The base 61 has a rectangular shape in the plan view, and has an opening 611 at the center thereof through which the light entrance side end of the projection lens 28 is inserted. The opening 611 has projections 612 and 613 projecting from the rectangular shape of the opening 611 in the plan view toward the inside thereof. The projection 612 is positioned in the upper part of the opening 611 on the −X side, and has a circular hole 612A penetrating in the ±Y direction. The projection 613 is provided at the corner where the inner surface of the opening 611 on the +X side and the inner surface of the opening 611 on the lower side cross each other. The projection 613 has a circular hole 613B penetrating in the ±Y direction at a position opposed to the circular hole 612A.

As illustrated in FIG. 3, track-shaped front surfaces 61A in the plan view whose longitudinal direction corresponds to the up-down direction are provided on the periphery of the opening 611. The front surfaces 61A are surfaces on which the first shift unit 8 (see FIG. 2) slides. The front surfaces 61A are positioned along the X-Z plane, one pair of the surfaces 61A are disposed on the +X side of the opening 611 at an upper position and a lower position, while the other pair of the surfaces 61A are disposed on the −X side of the opening 611 at an upper position and a lower position (one of the front surfaces 61A is not shown in the figure). A positioning hole 614 and two screw holes 615 are formed in the vicinity of each of the front surfaces 61A.

As illustrated in FIG. 3, a pair of bearing supports 616 projecting in the +Y direction from the front surfaces 61A are provided between the upper and lower front surfaces 61A on the +X side. The pair of the bearing supports 616 are parts where a transmission section 12 (described later, see FIG. 4) of the lens shift mechanism 4 is disposed, and are located away from each other with a predetermined distance left therebetween in such positions as to become substantially symmetric with respect to the X-Y plane containing the optical axis L. A concave portion 6161 penetrating in the ±Z direction is formed at the center of each end of the bearing supports 616. A screw hole and a positioning pin are provided on each front surface of the bearing supports 616 on both sides of the corresponding concave portion 6161.

A track hole 617 whose longitudinal direction corresponds to the up-down direction is formed between the pair of the bearing supports 616 and between the upper and lower front surfaces 61A on the −X side. A regulating member 87 (described later, see FIG. 6) of the lens shift mechanism 4 is inserted into each of the track holes 617. The base 61 has a plurality of bosses, the details of which are not discussed herein, each of the bosses has a screw hole for attachment of the optical device holder 7.

Each of the supports 62 is a part fixed to the lower case, and has a positioning hole and an insertion hole into which a screw is inserted.

As illustrated in FIG. 2, the lens shift mechanism 4 is attached to the +Y side of the base 61. The electro-optic device 27 is attached to the −Y side of the base 61 via the holder 274 fixed by screws.

The details of the optical device holder 7 are now explained.

The optical device holder 7 is formed by a sheet metal made of stainless steel, galvanized sheet iron or the like, and is fixed to the −Y side of the base 61 as illustrated in FIG. 3. The optical device holder 7 has a main body 71 having a rectangular shape in the plan view and extending along the Y-Z plane, an upper bended portion 72, a lower bended portion 73, a sub support 74, and a rear bended portion 75 as portions formed by bending the main body 71.

As illustrated in FIG. 3, the main body 71 is disposed in such a position that the +Y side upper end thereof is located above the base 61. A notch 711 (see FIG. 2) is formed below the upper end at a position opposed to the opening 611 of the base 61. An opening 712 is provided on the main body 71 in the vicinity of the −Y side end thereof. Openings 713 and 714 are also provided between the notch 711 and the opening 712.

The notch 711 is so sized that the holder 274 can be inserted therethrough. The notch 711 has a step whose length in the up-down direction (±Z direction) decreases toward the rear (−Y direction). More specifically, the notch 711 is formed in such a shape that openings are produced above and below the holder 274 inserted into the notch 711 as illustrated in FIG. 2. In this arrangement, air can be introduced through these openings to cool the electro-optic device 27.

As illustrated in FIG. 3, the opening 712 is a substantially rectangular opening in the plan view, through which the light released from the integrator illumination system 22 passes.

As illustrated in FIG. 3, the opening 713 is track-shaped and located at a position corresponding to the polarization plates 25R, 25G, and 25B. The opening 713 is an opening through which air is introduced to cool the polarization plates 25R, 25G, and 25B.

As illustrated in FIG. 3, the opening 714 has a shape as a combination of a track-shaped hole and a rectangular hole, and is formed at a position corresponding to the light modulation device 270G. The opening 714 is an opening through which air is introduced to cool the light modulation device 270G.

As illustrated in FIG. 3, the upper bended portion 72 is a portion produced by bending the upper end of the main body 71 in the +X direction. The +Y side end of the upper bended portion 72 projects in the +X direction more than the other portions. The projected end area of the upper bended portion 72 has an insertion hole at the position corresponding to the screw hole of the boss on the base 61 as a hole through which a screw is inserted.

As illustrated in FIG. 3, the lower bended portion 73 extends from the center of the lower side of the main body 71 to the +Y side end of the main body 71. The lower bended portion 73 is produced by bending the main body 71 in the −X direction, and has a distal end bended in the −Z direction (downward direction) as a fixing bended portion 731.

The sub support 74 is a portion fixed to the lower case. As illustrated in FIG. 3, the sub support 74 is disposed in the lower part of the main body 71 in the vicinity of the −Y side end thereof. The sub support 74 is produced by bending the man body 71 in the −X direction, and has an insertion hole in the vicinity of the distal end of the sub support 74 as a hole through which a screw is inserted.

As illustrated in FIG. 3, the rear bended portion 75 is a portion produced by bending the rear end of the main body 71 in the −X direction. The rear bended portion 75 has screw holes into which screws are inserted to fix a not-shown shield member thereto.

The optical device holder 7 is fixed to the lens holder 6 by which the electro-optic device 27 and the lens shift mechanism 4 are supported. More specifically, the optical device holder 7 is connected with the lens holder 6 via screws fixing the main body 71, the upper bended portion 72, and the fixing bended portion 731 to the bosses of the base 61.

The +X side surface of the main body 71 of the optical device holder 7 fixed to the lens holder 6 is a surface to which the color separation device 23 is attached, while the −X side surface of the main body 71 is a surface to which the integrator illumination system 22 is attached.

Structure of Lens Shift Mechanism

The details of the lens shift mechanism 4 are herein described.

As noted above, the lens shift mechanism 4 shifts the projection lens 28 in the ±X direction and ±Z direction (hereinafter, the shift direction in the ±X direction is referred to as the "X shift direction", and the shift direction in the ±Z direction is referred to as the "Z shift direction").

Figure 4:
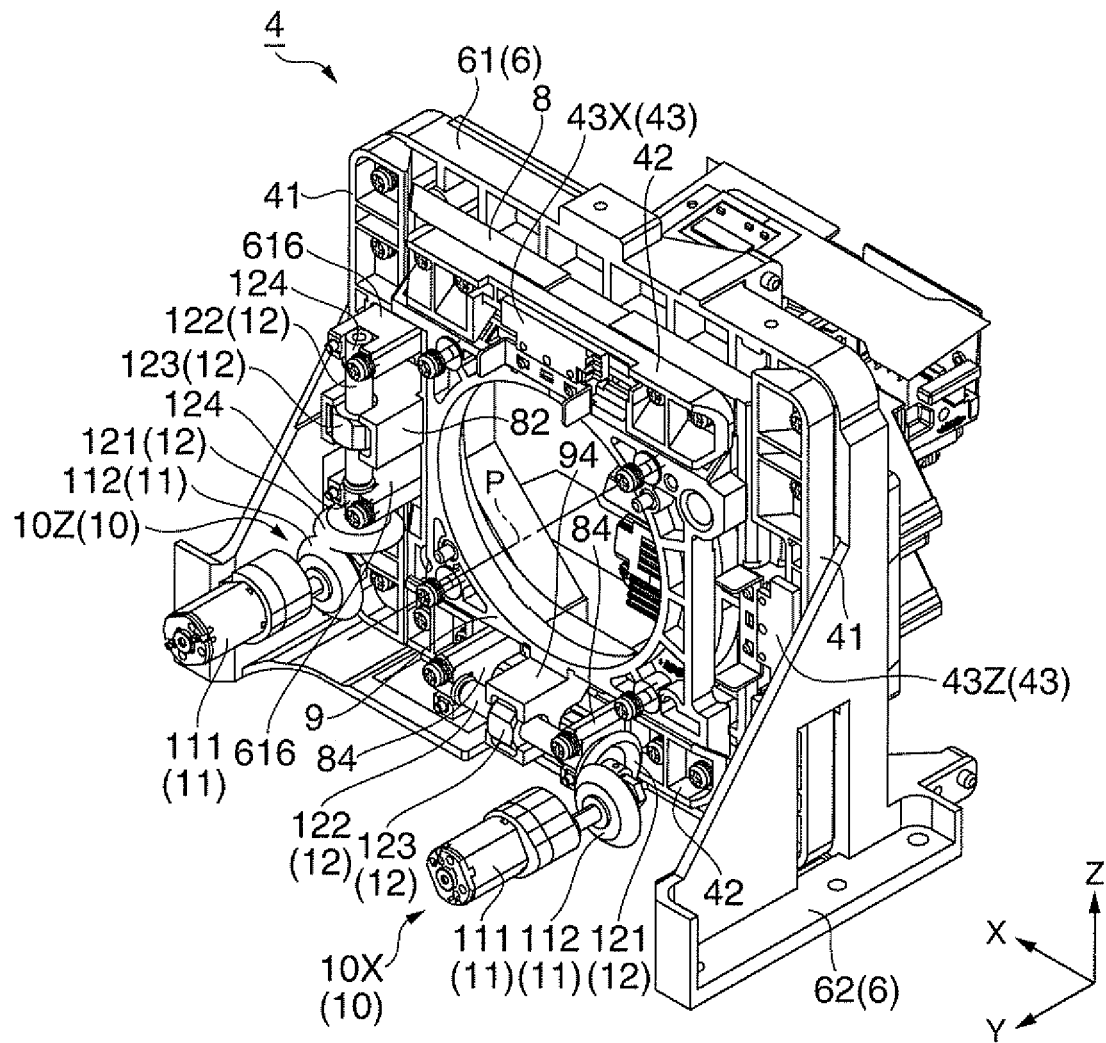
FIG. 4 is a perspective view of a lens shift mechanism according to the embodiment.
Figure 5:
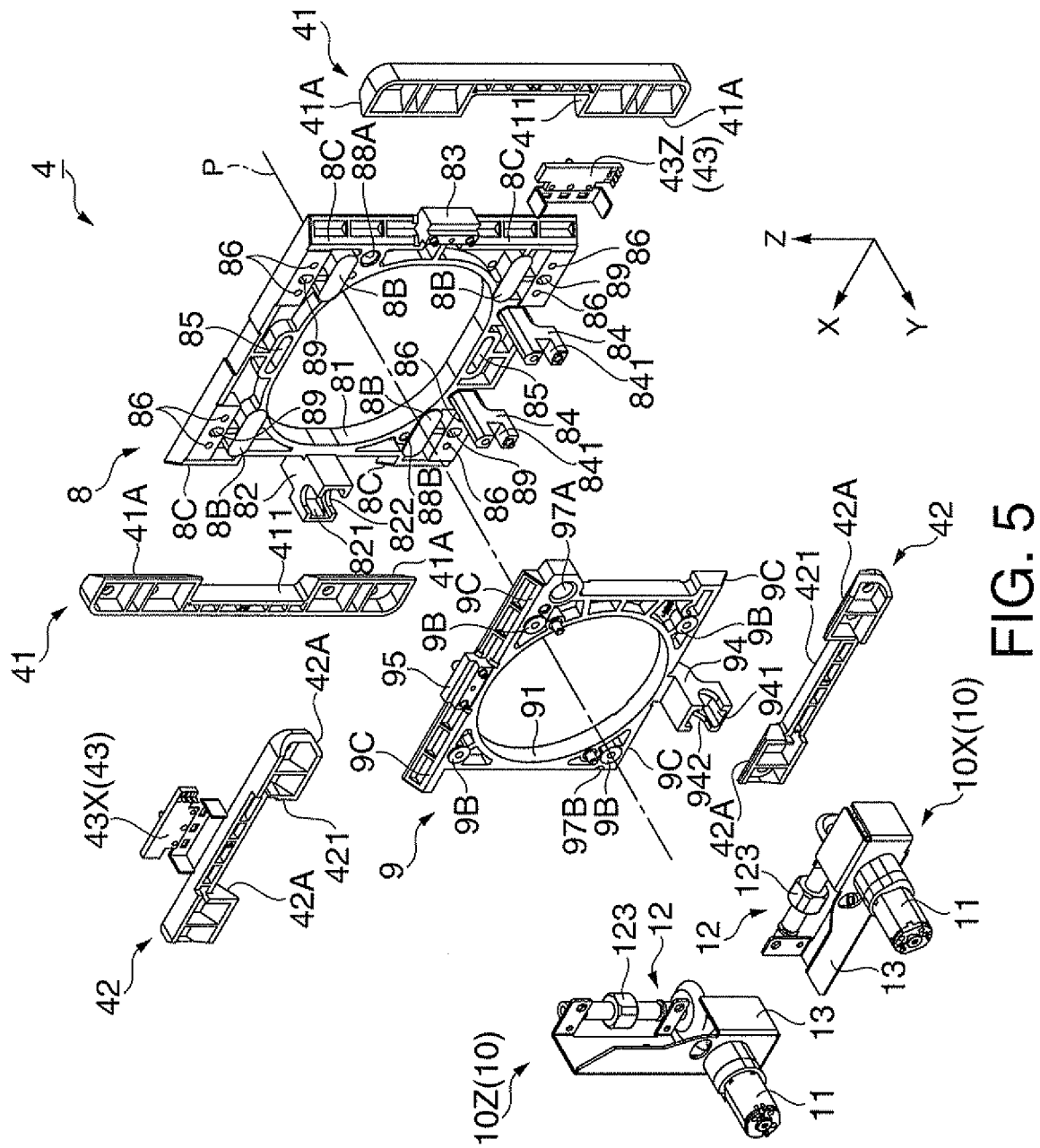
FIG. 5 is a perspective view of the disassembled lens shift mechanism according to the embodiment.
Figure 6:
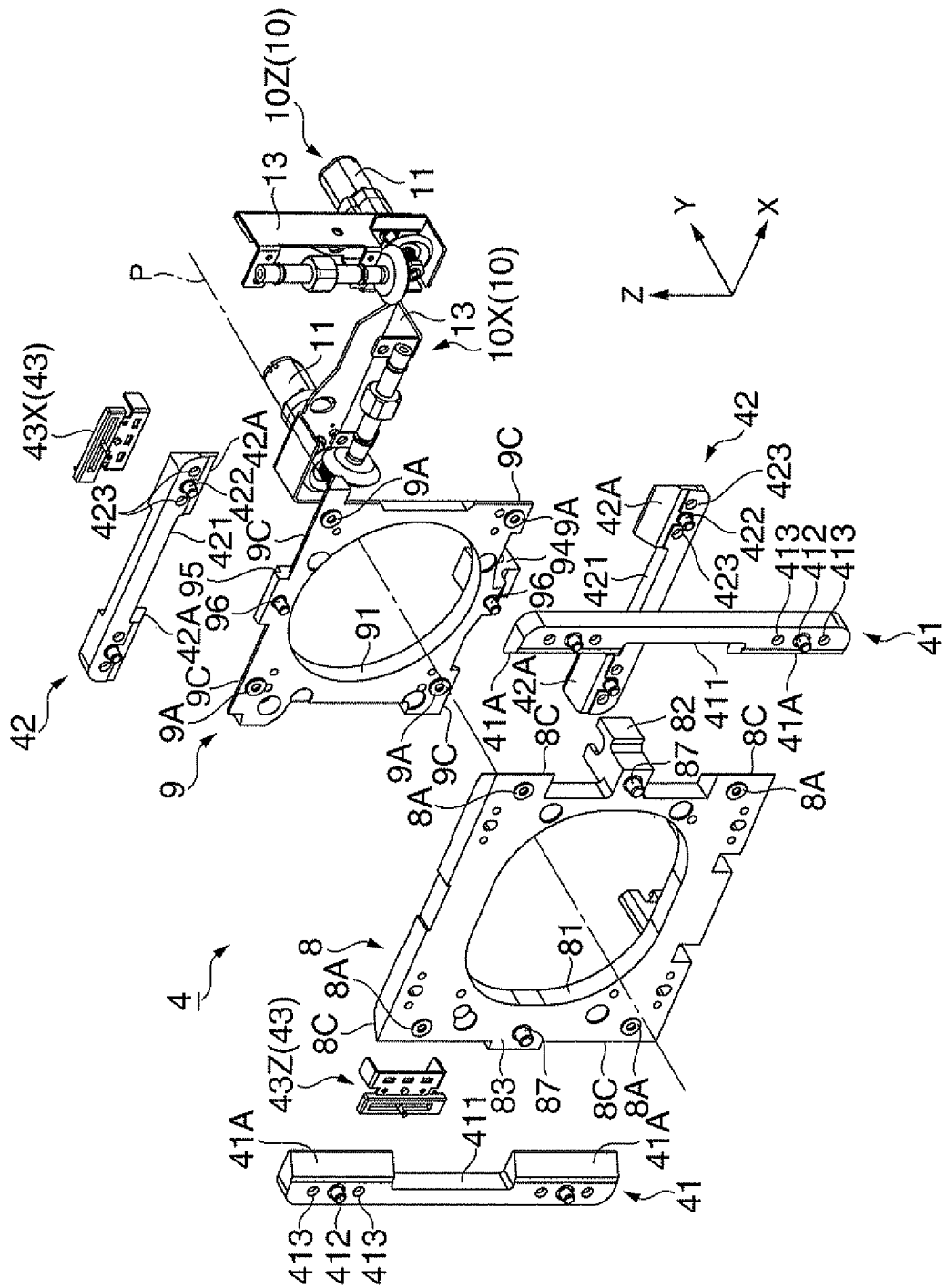
FIG. 6 is a perspective view of the disassembled lens shift mechanism according to the embodiment.

FIG. 4 is a perspective view illustrating the lens shift mechanism 4, where frames 13 described later (see FIG. 5) are not shown. FIGS. 5 and 6 are perspective views illustrating the disassembled lens shift mechanism 4. More specifically, FIG. 5 is a perspective view of the disassembled lens shift mechanism 4 as viewed from the front, while FIG. 6 is a perspective view of the disassembled lens shift mechanism 4 as viewed from the rear.

As illustrated in FIGS. 4 through 6, the lens shift mechanism 4 includes the first shift unit 8, a second shift unit 9, first adjustment side guide sections 41, second adjustment side guide sections 42, drive units 10, and a position detector 43 as well as the base 61.

The first shift unit 8 is so structured as to shift in the Z shift direction with respect to the base 61.

The first shift unit 8 is a rectangular plate-shaped component in the plan view made of magnesium or the like, and is disposed on the +Y side of the base 61 as illustrated in FIGS. 5 and 6. An opening 81 through which the light entrance side end of the projection lens 28 is inserted is formed at the center of the first shift unit 8. Rear surfaces 8A (see FIG. 6) and front surfaces 8B (see FIG. 5) are provided on the −Y side and the +Y side, respectively, on the first shift unit 8 around the opening 81. Inclined surfaces (shift side inclined surfaces 8C) inclined to a plane parallel with the Z shift direction and the optical axis P are provided at both ends of the first shift unit 8 on the ±X sides.

The rear surfaces 8A are surfaces which slide on the front surfaces 61A of the base 61 (see FIG. 3), and are provided along the X-Z plane. As illustrated in FIG. 6, the rear surfaces 8A are disposed on the surfaces of the portions projecting from the surrounding surface in a cylindrical shape, and are located at four positions corresponding to the front surfaces 61A of the base 61.

The front surfaces 8B are surfaces on which the second shift unit 9 slides, and are provided along the X-Z plane. As illustrated in FIG. 5, each of the front surfaces 8B has a track shape in the plan view whose longitudinal direction corresponds to the ±X direction. One pair of the front surfaces 8B are disposed above the opening 81, while the other pair of the front surfaces 8B are disposed below the opening 81, each pair of which are extended in the ±X direction. The first shift unit 8 has a positioning hole 89 and two screw holes 86 in the vicinity of each of the front surfaces 8B.

The shift side inclined surfaces 8C are surfaces which slide with respect to the first adjustment side guide sections 41. As illustrated in FIG. 5, the respective shift side inclined surfaces 8C provided on the front side of the first shift unit 8 extend in the +Y direction with inclination toward the optical axis P with respect to the Y-Z plane containing the optical axis P. The shift side inclined surfaces 8C are disposed at both the forward end and the backward end of the first shift unit 8 in the Z shift direction, that is, at both the upper and lower positions of each of the +X side end and the −X side end of the first shift unit 8. Each of the shift side inclined surfaces 8C has a plurality of recesses at the center thereof to reduce the contact area with the first adjustment side guide section 41 and thus decrease the frictional resistance during sliding.

As illustrated in FIGS. 5 and 6, a concave portion is formed between the upper and lower shift side inclined surfaces 8C on the +X side, and a rectangular parallelepiped engagement member 82 projecting from the front surfaces 8B toward the front (+Y direction) is provided at the center of the concave portion. The engagement member 82 is disposed at a position which passes through the plane crossing the Z shift direction at right angles and containing the optical axis P. That is, the engagement member 82 is positioned substantially at the center of the projection lens 28 in the Z shift direction.

As illustrated in FIG. 5, the engagement member 82 has a rectangular opening 821 on the front surface thereof. Each of the upper and lower walls of the opening 821 has a U-shaped notch 822. The opening 821 engages with a transmission main body 123 of a drive section 10Z described later, and a transmission shaft 122 is disposed on the notches 822.

As illustrated in FIG. 5, an attachment member 83 projecting in the −X direction is disposed between the upper and lower shift side inclined surfaces 8C on the −X side. The attachment member 83 has a positioning pin and screw holes such that the position detector 43 can be positioned and fixed to the attachment member 83 by screws.

As illustrated in FIG. 5, a pair of bearing supports 84 are provided at the lower end of the first shift unit 8 (−Z side). The pair of the bearing supports 84 are portions on which the transmission section 12 of a driving section 10X is disposed. The bearing. supports 84 project in the +Y direction from the front surfaces 8B and are located away from each other with a predetermined distance left therebetween in such a condition as to become substantially symmetric with respect to the Y-Z plane containing the optical axis P under the reference condition. A concave portion 841 penetrating in the X direction is formed at the center of each end of the bearing supports 84. A screw hole and a positioning pin are formed on each front surface of the bearing supports 84 on both sides of the concave portion 841.

As illustrated in FIG. 5, the first shift unit 8 has a track hole 85 whose longitudinal direction corresponds to the ±X direction between the pair of the bearing supports 84 and substantially at the center above the opening 81. The track holes 85 are holes into which regulating members 96 (described later, see FIG. 6) of the second shift unit 9 are inserted.

As illustrated in FIG. 6, the cylindrical regulating members 87 projecting in the −Y direction from the rear surfaces 8A are provided at positions opposite to the engagement member 82 and the attachment member 83. The regulating members 87 are inserted into the two track holes 617 of the base 61 (see FIG. 3) such that the shift of the regulating members 87 in the X shift direction is prevented by the track holes 617 and that the shift of the regulating members 87 in the Z shift direction is allowed within a predetermined range of the track holes 617. That is, the shift of the first shift unit 8 is regulated in the X shift direction, and is allowed in the Z shift direction from the contact position between the regulating members 87 and the upper inside surfaces of the track holes 617 to the contact position between the regulating members 87 and the lower inside surfaces of the track holes 617.

As illustrated in FIG. 5, the first shift unit 8 has circular holes 88A and 88B having the same center axes as those of the circular holes 612A and 613B of the base 61 (see FIG. 3) under the reference condition. The first shift unit 8 is not limited to the component made of magnesium as in this embodiment but may be made of other materials. It is preferable, however, that the first shift unit 8 is made of material different from that of the base 61 so as not to agglutinate with the base 61.

The second shift unit 9 is a component to which the projection lens 28 is attached, and is so structured as to shift with the projection lens 28 in the X shift direction with respect to the first shift unit 8.

The second shift unit 9 is a rectangular plate-shaped component in the plan view, and is made of aluminum or the like. As illustrated in FIGS. 5 and 6, the second shift unit 9 is disposed on the +Y side of the first shift unit 8. An opening 91 through which the light entrance side end of the projection lens 28 is inserted is formed at the center of the second shift unit 9. Rear surfaces 9A (see FIG. 6) and front surfaces 9B (see FIG. 5) are provided on the −Y side and +Y side, respectively, of the area on the second shift unit 9 around the opening 91. An inclined surface (shift side inclined surface 9C) inclined to the plane parallel with the X shift direction and the optical axis P is provided at each of the upper and lower ends of the second shift unit 9.

The rear surfaces 9A are surfaces which slide on the front surfaces 8B of the first shift unit 8, and are disposed on the X-Z plane. As illustrated in FIG. 6, the rear surfaces 9A are formed on the surfaces of the portions projecting in a cylindrical shape from the surrounding area, and are disposed at four positions corresponding to the front surfaces 8B of the first shift unit 8.

As illustrated in FIG. 5, the front surfaces 9B are formed on the surfaces of the portions projecting in a cylindrical shape from the surrounding area, and are disposed at four positions on the area outside the circumference of the opening 91 substantially at equal intervals. A screw hole is formed at the center of each of the front surfaces 9B. A positioning pin is provided in the vicinity of each of the two front surfaces 9B included in the four front surfaces 9B. The projection lens 28 is fixed to the front surfaces 9B by screws with the flange 281 positioned by the positioning pins.

The shift side inclined surfaces 9C are surfaces which slide with respect to the second adjustment side guide sections 42. As illustrated in FIG. 5, the shift side inclined surfaces 9C are disposed on the front surface side of the second shift unit 9, and are so constructed as to extend in the +Y direction with inclination toward the optical axis P with respect to the X-Y plane containing the optical axis P. The shift side inclined surfaces 9C are provided at both the forward end and the backward end of the second shift unit 9 in the X shift direction, that is, at the upper and lower positions of the ends of the second shift unit 9 on the +X side and −X side. Each of the shift side inclined surfaces 9C has a plurality of recesses at the center thereof so as to reduce the contact area with the corresponding second adjustment side guide section 42 and thus decrease the frictional resistance during sliding.

As illustrated in FIGS. 5 and 6, a concave portion is provided between the two shift side inclined surfaces 9C on the lower side. A rectangular parallelepiped engagement member 94 projecting from the front surfaces 9B toward the front (+Y direction) is provided at the center of the concave portion. The engagement member 94 is disposed at a position which passes through the plane crossing the X shift direction at right angles and containing the optical axis P. That is, the engagement member 94 is positioned substantially at the center of the projection lens 28 in the X shift direction.

As illustrated in FIG. 5, the engaging member 94 has a rectangular opening 941 on the front surface thereof similarly to the engagement member 82. Each of the +X side and −X side walls of the opening 941 has a U-shaped notch 942. The opening 941 engages with the transmission main body 123 of the driving section 10X described later, and the transmission shaft 122 is disposed on the notches 942.

As illustrated in FIG. 5, an attachment member 95 projecting in the +Z direction is disposed between the two upper shift side inclined surfaces 9C. The attachment member 95 has a positioning pin and screw holes such that the position detector 43 can be positioned and fixed to the attachment member 95 by screws.

As illustrated in FIG. 6, the second shift unit 9 has cylindrical regulating members 96 disposed at positions opposite to the engagement member 94 and the attachment member 95 and projecting in the −Y direction from the rear surfaces 9A. The regulating members 96 are inserted into the track holes 85 of the first shift unit 8 (see FIG. 5) such that the shift of the regulating members 96 in the Z shift direction is prevented by the track holes 85 and that the shift of the regulating members 96 in the X shift direction is allowed within a predetermined range of the track holes 85. That is, the second shift unit 9 follows the shift of the first shift unit 8 in the Z shift direction, and shifts in the X shift direction from the contact position between the regulating members 96 and the +X side inner surfaces of the track holes 85 to the contact position between the regulating members 96 and the −X side inner surfaces of the track holes 85.

The second shift unit 9 has circular holes 97A and 97B having the same center axes as those of the circular holes 612A and 613B of the base 61 (see FIG. 3) under the reference condition. The second shift unit 9 is not limited to the component made of aluminum as in this embodiment but may be made of other materials. It is preferable, however, that the second shift unit 9 is made of material different from that of the first shift unit 8 so as not to agglutinate with the first shift unit 8.

The first adjustment side guide sections 41 fixed to the front side of the base 61 guide the shift of the first shift unit 8 in cooperation with the base 61. Thus, the first adjustment side guide sections 41 and the base 61 correspond to a guide unit for guiding the first shift unit 8 in the Z shift direction.

As illustrated in FIGS. 5 and 6, each of the first adjustment side guide sections 41 made of synthetic resin has a rectangular shape in the plan view whose longitudinal direction corresponds to the up-down direction. One of the first adjustment side guide sections 41 is disposed opposed to the shift side inclined surface 8C on the +X side, and the other first adjustment side guide section 41 is disposed opposed to the shift side inclined surface 8C on the −X side. The two first adjustment side guide sections 41 have the same shape, each of which has a concave portion 411 at the center thereof on the side opposed to each other. The bearing supports 616 of the base 61 (see FIG. 3), and the engagement member 82 and the attachment member 83 of the first shift unit 8 are exposed through the concave portions 411.

As illustrated in FIG. 6, inclined surface (guide side inclined surfaces 41A) contacting the shift side inclined surfaces 8C are formed on the upper and lower sides of the concave portion 411 of each of the first adjustment side guide sections 41. The guide side inclined surfaces 41A are inclined to the plane parallel with the Z shift direction and the optical axis P similarly to the shift side inclined surfaces 8C, and are disposed substantially in parallel with the shift side inclined surfaces 8C. A positioning pin 412 and insertion holes 413 are provided in the vicinity of each of the guide side inclined surfaces 41A at positions corresponding to the positioning hole 614 and the screw holes 615 (see FIG. 3) of the base 61. Each of the positioning pins 412 has looseness for insertion of the corresponding positioning hole 614 such that the first adjustment side guide section 41 can be temporarily positioned with respect to the base 61.

After grease is applied between the front surfaces 61A of the base 61 and the rear surfaces 8A of the first shift unit 8 and between the guide side inclined surfaces 41A and the shift side inclined surfaces 8C, the positions of the first adjustment side guide sections 41 are adjusted with respect to the base 61 and fixed to the base 61 by screws. More specifically, the first adjustment side guide sections 41 are pressed into an appropriate contact condition between the guide side inclined surfaces 41A and the shift side inclined surfaces 8C under the reference condition of the first shift unit 8 with jigs inserted into the circular holes 88A and 88B of the first shift unit 8 and into the circular holes 612A and 613B of the base 61 so as to be fixed to the base 61 by screws.

The contact between the guide side inclined surfaces 41A and the shift side inclined surfaces 8C at both ends of the first shift unit 8 prevents the first shift unit 8 from shifting in the two directions perpendicular to the Z shift direction (±X direction and ±Y direction). That is, the first shift unit 8 can smoothly shift in the Z shift direction without looseness with the ends of the first shift unit 8 on the +X side and the −X side held between the front surfaces 61A of the base 61 and the guide side inclined surfaces 41A.

Accordingly, the base 61 has a function as a reference side guide section which guides the first shift unit 8 in the Z shift direction in cooperation with the first adjustment side guide sections 41. The front surfaces 61A and the guide side inclined surfaces 41A correspond to a holding section which holds the ends of the first shift unit 8 in such a manner that the first shift unit 8 can slide, which section is separately constituted by the base 61 and the first adjustment side guide sections 41. That is, a part of the holding section is provided on the first adjustment side guide sections 41 in correspondence with the shift side inclined surfaces 8C, while the other part of the holding section is provided on the base 61 in correspondence with the rear surfaces 8A. The first adjustment side guide sections 41 are not limited to components made of synthetic resin but may be made of other materials. It is preferable, however, that the first adjustment side guide sections 41 are made of material different from that of the first shift unit 8 so as not to agglutinate with the first shift unit 8.

The second adjustment side guide sections 42 are fixed to the front side of the first shift unit 8 to guide the shift of the second shift unit 9 in cooperation with the first shift unit 8. That is, the second adjustment side guide sections 42 and the first shift unit 8 correspond to a guide unit for guiding the second shift unit 9 in the X shift direction.

The second adjustment side guide sections 42 are made of synthetic resin. As illustrated in FIGS. 5 and 6, each of the second adjustment side guide sections 42 has a rectangular shape in the plan view whose longitudinal direction corresponds to the ±X direction, as a component disposed opposed to the upper or lower shift side inclined surface 9C of the second shift unit 9. The two second adjustment side guide sections 42 have the same shape, each of which has a concave portion 421 at the center thereof on the side opposed to each other. The bearing supports 84 of the first shift unit 8 and the engagement member 94 and the attachment member 95 of the second shift unit 9 are exposed through the concave portions 421.

Inclined surfaces (guide side inclined surfaces 42A) in contact with the shift side inclined surfaces 9C are provided on each of the second adjustment side guide sections 42 on both sides of the concave portion 421. The guide side inclined surfaces 42A are inclined to the plane parallel with the X shift direction and the optical axis P similarly to the shift side inclined surfaces 9C, and are disposed substantially in parallel with the shift side inclined surfaces 9C. A positioning pin 422 and insertion holes 423 are provided in the vicinity of each of the guide side inclined surfaces 42A at positions corresponding to the positioning hole 89 and the screw holes 86 of the first shift unit 8. Each of the positioning pins 422 has looseness for insertion into the corresponding positioning hole 89 such that the second adjustment side guide section 42 can be temporarily positioned with respect to the first shift unit 8.

After grease is applied between the front surfaces 8B of the first shift unit 8 and the rear surfaces 9A of the second shift unit 9 and between the guide side inclined surfaces 42A and the shift side inclined surfaces 9C, the positions of the second adjustment side guide sections 42 are adjusted with respect to the first shift unit 8 and fixed to the first shift unit 8 by screws. More specifically, the second adjustment side guide sections 42 are pressed into an appropriate contact condition between the guide side inclined surfaces 42A and the shift side inclined surfaces 9C under the reference condition of the first shift unit 8 and the second shift unit 9 with jigs inserted into the circular holes 97A and 97B of the second shift unit 9, the circular holes 88A and 88B of the first shift unit 8 and into the circular holes 612A and 613B of the base 61 so as to be fixed to the first shift unit 8 by screws.

The contact between the upper and lower shift side inclined surfaces 9C and the guide side inclined surfaces 42A prevents the second shift unit 9 from shifting in the two directions perpendicular to the X shift direction (±Y direction and ±Z direction). That is, the second shift unit 9 can smoothly shift in the X shift direction without looseness with the upper and lower ends of the second shift unit 9 held between the front surfaces 8B of the first shift unit 8 and the guide side inclined surfaces 42A.

Accordingly, the first shift unit 8 has a function as a reference side guide unit which guides the second shift unit 9 in the X shift direction in cooperation with the second adjustment side guide sections 42. The front surfaces 8B and the guide side inclined surfaces 42A correspond to a holding section which holds the ends of the second shift unit 9 in such a manner that the second shift unit 9 can slide, which section is separately constituted by the first shift unit 8 and the second adjustment side guide sections 42. That is, a part of the holding section is provided on the second adjustment side guide sections 42 in correspondence with the shift side inclined surfaces 9C, while the other part of the holding section is provided on the first shift unit 8 in correspondence with the rear surfaces 9A. The second adjustment side guide sections 42 are not limited to components made of synthetic resin but may be made of other materials. It is preferable, however, that the second adjustment side guide sections 42 are made of material different from that of the second shift unit 9 so as not to agglutinate with the second shift unit 9.

As illustrated in FIGS. 5 and 6, the drive units 10 include the drive section 10Z which shifts the first shift unit 8 in the Z shift direction, and the drive section 10X which shifts the second shift unit 9 in the X shift direction. The components constituting the drive section 10Z are common to the components constituting the drive section 10X. As illustrated in FIG. 4, the drive section 10Z is disposed on the +X side of the first shift unit 8, while the drive section 10X is disposed on the −Z side of the first shift unit 8.

The drive section 10Z is herein touched upon.

FIGS. 7A and 7B are perspective views of the drive section 10Z. More specifically, FIG. 7A is a perspective view of the drive section 10Z as viewed from the front, while FIG. 7B is a perspective view of the drive section 10Z as viewed from the rear.

As illustrated in FIGS. 7A and 7B, the drive section 10Z has a rotation section 11 to be rotated, the transmission section 12 which transmits the rotation of the rotation section 11 to the first shift unit 8 (see FIG. 5), and the frame 13 which supports these components 11 and 12.

The rotation section 11 has a motor 111, a first bevel gear 112, and a coil spring SP.

The motor 111 has a motor main body 113 and a wheel train 114. The motor main body 113 is connected with the controller via a not-shown cable. The wheel train 114 has a plurality of gears (not shown) engaging with the motor main body 113, and a driving shaft 115.

The motor 111 rotates the motor main body 113 in response to an instruction from the controller, and reduces the rotation speed via the wheel train 114 to rotate the driving shaft 115 at a lower speed.

The first bevel gear 112 having a center axis 112J is a component into which the driving shaft 115 is inserted.

The coil spring SP is a component into which the driving shaft 115 is inserted, and is disposed in such a condition as to urge the first bevel gear 112 toward the motor 111. The first bevel gear 112 rotates with the driving shaft 115 and the coil spring SP, and idles while resisting the urging force of the coil spring SP when a predetermined load or larger is applied to prevent breakage of the motor 111.

The transmission section 12 has a second bevel gear 121, the transmission shaft 122, the transmission main body 123, and bearings 124. As illustrated in FIG. 4, the transmission section 12 of the drive section 10Z is supported by a pair of the bearing supports 616 of the base 61.

The second bevel gear 121 has a center axis 121J. The gear ratio of the first bevel gear 112 and the second bevel gear 121 is set at 1:1.

The transmission shaft 122 has a gear insertion portion (not shown) provided at one end thereof, sliding portions 122A, and a screw portion 122B. The transmission shaft 122 of the drive section 10Z is extended between the pair of the bearing supports 616 and held thereby via the bearings 124 such that the gear insertion portion projects from the lower bearing support 616.

The second bevel gear 121 into which the gear insertion portion is inserted is fixed to the gear insertion portion by a not-shown stopper.

The sliding portions 122A are disposed at a position adjacent to the gear insertion portion and at the end opposite to the gear insertion portion, as positions corresponding to the pair of the bearing supports 616.

The screw portion 122B is disposed between the two sliding portions 122A, that is, between the pair of the bearing supports 616.

The transmission main body 123 engages with the engagement member 82 of the first shift unit 8. More specifically, the transmission main body 123 has a cylindrical external shape to be inserted into the opening 821 of the engagement member 82 (see FIG. 5), and has an inner surface where a screw groove is formed. The transmission main body 123 is positioned with engagement between the screw groove and the screw portion 122B of the transmission shaft 122.

Each of the bearings 124 has a cylindrical external shape to engage with the corresponding concave portion 6161 of the bearing support 616 (see FIG. 3), and has an inner surface into which the corresponding sliding portion 122A of the transmission shaft 122 is rotatably inserted.

As illustrated in FIG. 4, the transmission section 12 of the drive section 10Z is disposed with respective engagements between the bearings 124 and the bearing supports 616 and between the transmission main body 123 and the engagement member 82, in which condition the second bevel gear 121 projects from the lower bearing support 616.

The frame 13 is so constructed as to support the rotation section 11, and support the transmission section 12 in cooperation with the bearing supports 616.

The frame 13 of the drive section 10Z is formed by a sheet metal, and produced by bending the sheet metal into a rectangular parallelepiped shape whose longitudinal direction corresponds to the up-down direction as illustrated in FIGS. 7A and 7B. A drive support portion 131 constituting one wall portion of the frame 13 has a hole in the vicinity of the lower end of the drive support portion 131 as a hole into which the driving shaft 115 is inserted. The rotation section 11 is fixed to the frame 13 by screws in such a condition that the motor main body 113 is positioned outside the frame 13 and that the first bevel gear 112 is positioned inside the frame 13.

As illustrated in FIGS. 7A and 7B, a bearing pressing portion 132 having a width substantially equal to the length of the bearing 124 in the axial direction is provided for each of the bearings 124 at a position opposed to the drive support portion 131 of the frame 13. Each of the bearing pressing portions 132 is so structured that the bearing 124 can be held between the bearing pressing portion 132 and the bearing support 616, and has an insertion hole and a positioning hole at positions corresponding to the screw hole and the positioning pin of the corresponding bearing support 616.

The drive section 10Z is fixed to the base 61 in such a condition that the transmission section 12 is extended between the two bearing supports 616. In this case, the rotation section 11 supported by the frame 13 is positioned below the transmission section 12, and the bearing pressing portions 132 are fixed to the bearing supports 616 by screws. In addition, as illustrated in FIG. 4, the rotation section 11 is disposed such that the first bevel gear 112 engages with the second bevel gear 121, and that the center axis 112J (see FIG. 7A) extends in the same direction as that of the optical axis P. On the other hand, the transmission section 12 is disposed such that the center axis 121J (see FIG. 7A) extends in the Z shift direction.

That is, the drive section 10Z is disposed at a position close to the +X side of the projection lens 28. In this case, the rotation section 11 extends in the same direction as the extending direction of the projection lens 28, and the transmission section 12 located between the upper and lower guide side inclined surfaces 41A (see FIG. 5) extends in the same direction as the Z shift direction.

Similarly, the drive section 10X is disposed in such a condition that the transmission section 12 is extended between the two bearing supports 84, and that the transmission main body 123 engages with the engagement member 94. In addition, the drive section 10X is fixed to the first shift unit 8 with the rotation section 11 supported by the frame 13 and disposed on the −X side of the transmission section 12 and with the bearing pressing portions 132 fixed to the bearing supports 84 by screws. Moreover, as illustrated in FIG. 4, the rotation section 11 is disposed in such a condition that the first bevel gear 112 engages with the second bevel gear 121, and that the center axis 112J (see FIG. 7A) extends in the same direction as that of the optical axis P. On the other hand, the transmission section 12 is disposed in such a position that the center axis 121J (see FIG. 7A) extends in the X shift direction.

In other words, the drive section 10X located in the vicinity of the −Z side of the projection lens 28 is disposed such that the rotation section 11 extends in the same direction as the extending direction of the projection lens 28, and that the transmission section 12 positioned between the guide side inclined surfaces 42A on the ±X sides (see FIG. 5) extends in the same direction as the X shift direction.

Therefore, according to the drive units 10 located in the vicinity of the projection lens 28, each of the rotation sections 11 is disposed in such a position as to extend in the same direction as the extending direction of the projection lens 28, and each of the transmission sections 12 is disposed in such a position as to extend in the same direction as the shift direction. Moreover, the drive units 10 do not project from the base 61 to the outside as viewed in the direction of the optical axis P.

The position detector 43 has a function of detecting the position of the projection lens 28, and includes a position detecting section 43Z for detecting the position of the first shift unit 8, and a position detecting section 43X for detecting the position of the second shift unit 9 as illustrated in FIG. 5. The components constituting the position detecting section 43Z are common to the components constituting the position detecting section 43X. The position detecting section 43Z is attached to the attachment member 83 of the first shift unit 8, while the position detecting section 43X is attached to the attachment member 95 of the second shift unit 9. Each of the position detecting sections 43Z and 43X is connected with the controller via a not-shown cable. Each of the position detecting sections 43Z and 43X is constituted by a component which utilizes variations in resistance, or variations in light or magnetism.

Operation of Lens Shift Mechanism

The operation of the lens shift mechanism 4 is now explained.

When the drive section 10Z is actuated in response to an instruction from the controller, the lens shift mechanism 4 shifts the projection lens 28 in the Z shift direction. On the other hand, when the drive section 10X is actuated, the lens shift mechanism 4 shifts the projection lens 28 in the X shift direction.

More specifically, when the drive section 10Z of the lens shift mechanism 4 is driven by operation of the operation panel or the remote controller, the rotation section 11 rotates the second bevel gear 121 via the first bevel gear 112. With rotation of the second bevel gear 121, the transmission shaft 122 of the transmission section 12 rotates, whereby the transmission main body 123 engaging with the screw portion 122B moves upward or downward in accordance with the rotation direction.

The first shift unit 8 the engagement member 82 of which engages with the transmission main body 123 shifts in the Z shift direction along with the transmission main body 123. Also, the second shift unit 9 engaging with the first shift unit 8 in the Z shift direction shifts in the Z shift direction along with the first shift unit 8. As a result, the projection lens 28 fixed to the second shift unit 9 shifts in the Z direction together with the first shift unit 8.

According to the lens shift mechanism 4, therefore, the first shift unit 8 moves in response to the actuation of the drive section 10Z to shift the projection lens 28 in the Z shift direction. In this case, the first shift unit 8 shifts with the forward end and the backward end thereof in the Z shift direction supported by the front surfaces 61A and the guide side inclined surfaces 41A. Moreover, the first shift unit 8 holds the projection lens 28 via the second shift unit 9 in the Z shift direction.

Similarly, according to the lens shift mechanism 4, the transmission main body 123 shifts in response to the actuation of the drive section 10X. Also, the second shift unit 9 whose engagement member 94 engages with the transmission main body 123 shifts in the X shift direction along with the transmission main body 123. As a result, the projection lens 28 fixed to the second shift unit 9 shifts in the X shift direction together with the second shift unit 9.

According to the lens shift mechanism 4, therefore, the second shift unit 9 moves in response to the actuation of the drive section 10X to shift the projection lens 28 in the X shift direction. In this case, the second shift unit 9 shifts with the forward end and the backward end thereof in the X shift direction supported by the front surfaces 8B and the guide side inclined surfaces 42A.

Accordingly, the following advantages can be provided by the projector 1 in this embodiment.

(1) Each of the drive units 10 is located in the vicinity of the projection lens 28. In this arrangement, the rotation section 11 is disposed in such a position as to extend in the same direction as the extending direction of the projection lens 28, and the transmission section 12 is disposed in such a position as to extend in the same direction as the shift direction. According to this structure, the components of the lens shift mechanism 4 can be positioned with high efficiency in the space around the projection lens 28 which often becomes a dead space. Thus, the size of the lens shift mechanism 4, and thus the size of the entire projector 1 can be reduced.

(2) The ends of the first shift unit 8 slide on the front surfaces 61A and on the guide side inclined surfaces 41A as the holding section, while the second shift unit 9 slides on the front surfaces 8B and on the guide side inclined surfaces 42A as the holding section. In this case, the shift unit is not required to have a space where a shaft is provided and a shape through which the shaft is inserted unlike a structure where the shift unit shifts along the shaft. Accordingly, the size of the lens shift mechanism 4, and thus the size of the entire projector 1 can be reduced.

The first shift unit 8 is prevented from moving in the two directions perpendicular to the Z shift direction by the guide side inclined surface 41A and the shift side inclined surfaces 8C. The second shift unit 9 is prevented from moving in the two directions perpendicular to the X shift direction by the guide side inclined surfaces 42A and the shift side inclined surfaces 9C. Thus, the first shift unit 8 and the second shift unit 9 can shift with reduced looseness during movement, allowing the projection lens 28 to smoothly shift. Accordingly, the projector 1 can shift a projected image with fine control.

(3) The positions of the first adjustment side guide sections 41 can be adjusted with respect to the base 61. Thus, the positions of the first adjustment side guide sections 41 can be controlled in accordance with dimensional variations of the parts such as the first shift unit 8 such that the contact condition between the guide side inclined surfaces 41A and the first shift unit 8 can be appropriately controlled. Accordingly, the first shift unit 8 can smoothly shift with higher accuracy.

Similarly, the positions of the second adjustment side guide sections 42 can be adjusted with respect to the first shift unit 8. Thus, the second shift unit 9 can smoothly shift with higher accuracy.

(4) The first shift unit 8 shifts with the forward end and the backward end of the first shift unit 8 in the Z shift direction supported by the front surfaces 61A and the guide side inclined surfaces 41A. On the other hand, the second shift unit 9 shifts with the forward end and the backward end of the second shift unit 9 in the X shift direction supported by the front surfaces 8B and the guide side inclined surfaces 42A. Moreover, the transmission section 12 of the drive section 10Z is provided between the guide side inclined surface 41A on the forward end side and the guide side inclined surface 41A on the backward end side, while the transmission section 12 of the drive section 10X is provided between the guide side inclined surface 42A on the forward end side and the guide side inclined surface 42A on the backward end side.

According to this structure, each of the first shift unit 8 and the second shift unit 9 shifts with the forward and backward sides thereof in the shift direction supported with a good balance. In addition, the transmission section 12 can be efficiently arranged. Accordingly, smooth shift of the first shift unit 8 and the second shift unit 9 with higher accuracy can be achieved without increasing the size of the lens shift mechanism 4.

(5) The engagement member 82 is positioned substantially at the center of the projection lens 28 in the Z shift direction. Also, the engagement member 94 is positioned substantially at the center of the projection lens 28 in the X shift direction. According to this structure, the projection lens 28 can move in both the Z shift direction and the X shift direction with reduced moments generated during movement. Accordingly, power saving achieved by reduction of the power of the rotation section 11 and size reduction of the drive units 10, and also smooth shift of the projection lens 28 with higher accuracy can be realized.

(6) The gear ratio of the first bevel gear 112 and the second bevel gear 121 is set at 1:1. In this case, both the bevel gears 112 and 121 can be identically shaped, and thus common components can be used to manufacture the first and second bevel gears 112 and 121. Moreover, both the bevel gears 112 and 121 can be disposed with higher efficiency than first and second bevel gears having different sizes. Accordingly, cost reduction and further size reduction of the lens shift mechanism 4 can be achieved.

MODIFIED EXAMPLES

This embodiment can be modified in the following manners.

According to this embodiment, the first shift unit 8 and the first adjustment side guide sections 41 are so structured that the shift side inclined surfaces 8C and the guide side inclined surfaces 41A have face-contact with each other. However, only either the shift side inclined surfaces 8C or the guide side inclined surfaces 41A may be provided as inclined surfaces, and the other surfaces 8C or 41A may have linear-contact or point-contact with the inclined surfaces such that shift in the two directions perpendicular to the Z shift direction can be prevented.

Similarly, the second shift unit 9 and the second adjustment side guide sections 42 are so structured that the shift side inclined surfaces 9C and the guide side inclined surfaces 42A have face-contact with each other. However, only either the shift side inclined surfaces 9C or the guide side inclined surfaces 42A may be provided as inclined surfaces, and the other surfaces 9C or 42A may be shaped to have linear-contact or point-contact with the inclined surfaces such that shift in the two directions perpendicular to the X shift direction can be prevented.

According to this embodiment, the lens shift mechanism 4 can shift the projection lens 28 in the two directions perpendicular to the optical axis P (±Z direction and ±X direction). However, the lens shift mechanism 4 may shift the projection lens 28 only in one direction such as ±Z direction.

According to this embodiment, the rotation section 11 is an electrically driven type which has a motor main body. However, the rotation section 11 may be a manual type which has an operation unit operated by the user to rotate the first bevel gear in accordance with the operation inputted through the operation unit.

While the projector 1 in this embodiment includes the reflection type liquid crystal panels 272 as the light modulation devices. However, the light modulation devices may be transmission type liquid crystal panels.

While the light source device 21 includes the discharge type light source 211 in this embodiment, the light source device 21 may be constituted by various types of solid light emitting elements such as a laser diode, an LED (light emitting diode), an organic EL (electro luminescence) element, and a silicon light emitting element.

What is claimed is:

1. A projector, comprising:
   a light source;
   an electro-optic device which modulates light emitted from the light source;
   a projection lens having an optical axis and which projects the light modulated by the electro-optic device; and
   a lens shift mechanism which shifts the projection lens in a shift direction substantially perpendicular to the optical axis of the projection lens, the lens shift mechanism including:
      a shift unit which supports the projection lens and shifts the projection lens in the shift direction perpendicular to the optical axis,
      a guide unit which guides the shift of the shift unit, and
      a drive unit which moves the shift unit, the drive unit including:
         a rotation section as a rotated part which has a first bevel gear rotating around a center axis that extends in the same direction as the optical axis, and
         a transmission section which has a second bevel gear engaged with the first bevel gear and configured to transmit the rotation of the rotation section to the shift unit, the guide unit having a holding section which holds an end of the shift unit in such a manner that the shift unit can slide, and an inclined surface inclined to a plane parallel with the shift direction of the shift unit, the optical axis being provided either at the end of the shift unit or on the holding section of the guide unit.

2. The projector according to claim 1, the axis of the rotation transmitted by the transmission section crossing the optical axis.

3. The projector of claim 2, the transmission section being perpendicular to the optical axis.

4. The projector of claim 1, the guide unit being configured to substantially prevent the shift unit from moving in two different directions that are each perpendicular to the shift direction.

5. The projector according to claim 1,
   the guide unit further having:
      a reference side guide section, and an adjustment side guide section whose position is controlled with respect to the reference side guide section;
      the adjustment side guide section including a part of the holding section corresponding to the inclined surface; and
      the reference side guide section including an other part of the holding section.

6. The projector according to claim 1, the shift unit including:
   a forward end; and
   a backward end,
   the inclined surface being provided on each of the forward end and the backward end of the shift unit in the shift direction;
   the transmission section being disposed between the forward end side inclined surface and the backward end side inclined surface.

7. The projector according to claim 1,
   the transmission section further having a transmission main body which shifts in accordance with the rotation of the rotation section;
   the shift unit further having an engagement member which engages the transmission main body; and
   the engagement member being disposed at a position which passes through a plane crossing the shift direction of the shift unit at right angles and containing the optical axis.

8. The projection of claim 7, the engagement member of the shift unit being configured to shift with the transmission main body by the rotation of the rotation section.

9. The projector according to claim 1, the first bevel gear and the second bevel gear having a gear ratio of 1:1.

10. The projection of claim 9, the first bevel gear and the second bevel gear having substantially the same shape.

11. A shift mechanism which shifts a projection lens in a shift direction perpendicular to a central axis of the projection lens, the shift mechanism comprising:
    a shift unit which shifts the projection lens in a direction perpendicular to the central axis; and
    a drive unit which moves the shift unit, the drive unit having:
       a rotatable part having a first bevel gear rotating around an axis parallel to the central axis, and
       a transmission part which has a second bevel gear engaged with the first bevel gear and configured to transmit the rotation of the rotatable part to the shift unit, the axis of the rotation transmitted by the transmission part being perpendicular to the central axis; a guide unit which guides the shift of the shift unit, the guide unit having a holding section which holds an end of the shift unit in such a manner that the shift unit can slide, and an inclined surface inclined to a plane parallel with the shift direction of the shift unit, the optical axis being provided either at the end of the shift unit or on the holding section of the guide unit; and.

12. A method of shifting a projection lens in a direction perpendicular to a central axis of the projection lens, the method comprising:
    shifting the projection lens, with a shift unit, in a direction perpendicular to the central axis; and
    moving the shift unit with a drive unit including:
       rotating a part including a first bevel gear around an axis parallel to the central axis, and
       transmitting with a transmission part having a second bevel gear engaged with the first bevel gear the rotation of the rotating part to the shift unit, the axis of the rotation transmitted by the transmission part being perpendicular to the central axis; guiding the shift of the shift unit with a guide unit having a holding section which holds an end of the shift unit in such a manner that the shift unit can slide and an inclined surface inclined to a plane parallel with the shift direction of the shift unit, the optical axis being provided either at the end of the shift unit or on the holding section of the guide unit; and.

* * * * *